United States Patent [19]

Takano

[11] Patent Number: 4,462,276
[45] Date of Patent: Jul. 31, 1984

[54] CONTROL SYSTEM FOR AUTOMATIC TRANSMISSION WITH OVERDRIVE DEVICE

[75] Inventor: Toshio Takano, Hamuramachi, Japan

[73] Assignee: Fuji Jukogyo Kabushiki Kaisha, Tokyo, Japan

[21] Appl. No.: 297,889

[22] Filed: Aug. 31, 1981

[30] Foreign Application Priority Data

Sep. 9, 1980 [JP] Japan ................. 55-125436
Sep. 9, 1980 [JP] Japan ................. 55-125437

[51] Int. Cl.³ .............. B60K 41/18; F16H 3/74; F16H 47/08
[52] U.S. Cl. .................. 74/866; 74/752 D; 74/688
[58] Field of Search .......... 74/688, 752 C, 752 D, 74/752 A, 866, 867, 868

[56] References Cited

U.S. PATENT DOCUMENTS

| | | | |
|---|---|---|---|
| 2,214,099 | 9/1940 | Claytor | 74/752 D |
| 2,241,631 | 5/1941 | Claytor | 74/752 D |
| 2,267,603 | 12/1941 | Claytor | 74/752 D |
| 2,281,916 | 5/1942 | Claytor | 74/752 D |
| 2,283,623 | 5/1942 | Claytor | 74/752 D |
| 2,933,944 | 4/1960 | Carnagua | 74/752 A |
| 2,946,240 | 7/1960 | Kop | 74/752 C |
| 3,159,051 | 12/1964 | Herndon et al. | 74/688 |
| 3,486,398 | 12/1969 | Waclawek | 74/688 |
| 3,559,508 | 2/1971 | Kelbel | 74/752 A |
| 3,597,999 | 8/1971 | Fisher | 74/688 |
| 4,036,081 | 7/1977 | Onuma et al. | 74/688 X |
| 4,224,837 | 9/1980 | Crosswhite | 74/688 |
| 4,226,123 | 10/1980 | Crosswhite | 74/688 |
| 4,296,646 | 10/1981 | Thornton | 74/688 |
| 4,331,044 | 5/1982 | Bookout et al. | 74/688 |
| 4,347,765 | 9/1982 | Leonard et al. | 74/688 X |

FOREIGN PATENT DOCUMENTS

55-8949  1/1980  Japan ................. 74/866

*Primary Examiner*—Allan D. Herrmann
*Assistant Examiner*—Stephen B. Andrews
*Attorney, Agent, or Firm*—Martin A. Farber

[57] ABSTRACT

An automatic transmission having a torque converter, an automatic transmission apparatus comprising a planetary gear device and a forward clutch, and a final reduction gear device connected to an output shaft of the automatic transmission apparatus. An overdrive device comprising a fluid operated overdrive clutch and overdrive gears is provided between the output shaft of the torque converter and the final reduction gear device. A hydraulic circuit is provided for supplying pressure oil to the forward clutch and the overdrive clutch. An electro-magnetic valve is provided to be operated by a manual switch for supplying the pressure oil to the overdrive clutch for establishing the overdrive transmission.

6 Claims, 3 Drawing Figures

CONTROL SYSTEM FOR AUTOMATIC TRANSMISSION WITH OVERDRIVE DEVICE

BACKGROUND OF THE INVENTION

In a conventional automatic transmission with an overdrive device, a planetary gear device is used for increasing the rotational speed of the output of the transmission. In such a construction, a pair of planetary gear devices must be provided on an axis, which further requires providing at least two transmitting devices comprising a clutch, a band and a one-way clutch. Such a construction makes the apparatus large and complicated, which also causes complications in the hydraulic control system. In a vehicle with an automatic transmission, since the gear shifting occurs automatically, it is desirable for an overdrive transmission also to be automatically performed from any transmission condition and for a return to a proper transmission condition to be made in response to vehicle speed when the overdrive condition is released by a kickdown operation.

Considering these situations, the present invention seeks to provide a control system for an automatic transmission in which the overdrive transmission is performed through the automatic transmission and an overdrive device comprises an overdrive clutch and overdrive gears.

According to the present invention, there is provided in a control system for an automatic transmission with an overdrive device for engine powered vehicles in which power from the engine is transmitted to a final reduction gear for driving the vehicle wheels through a planetary gear type automatic transmission having a forward clutch, the improvement comprising a fluid operated overdrive clutch for transmitting the power to the driving wheels of the vehicle through the overdrive device, a hydraulic circuit for supplying pressure oil to the forward clutch, an overdrive clutch provided in the hydraulic circuit, an electromagnetic overdrive valve provided in the hydraulic circuit, a manually operated overdrive switch provided in the electric circuit for said electro-magnetic valve, the electromagnetic overdrive valve being arranged such that the pressure oil is supplied to the forward clutch for the engagement thereof when the overdrive switch is not operated, and the pressure oil is supplied to the overdrive clutch for the engagement thereof upon closing of said overdrive switch for establishing the overdrive transmission.

The present invention will be fully described with reference to the accompanying drawings.

DETAILED DESCRIPTION OF PREFERRED EMBODIMENTS

Figure 1:
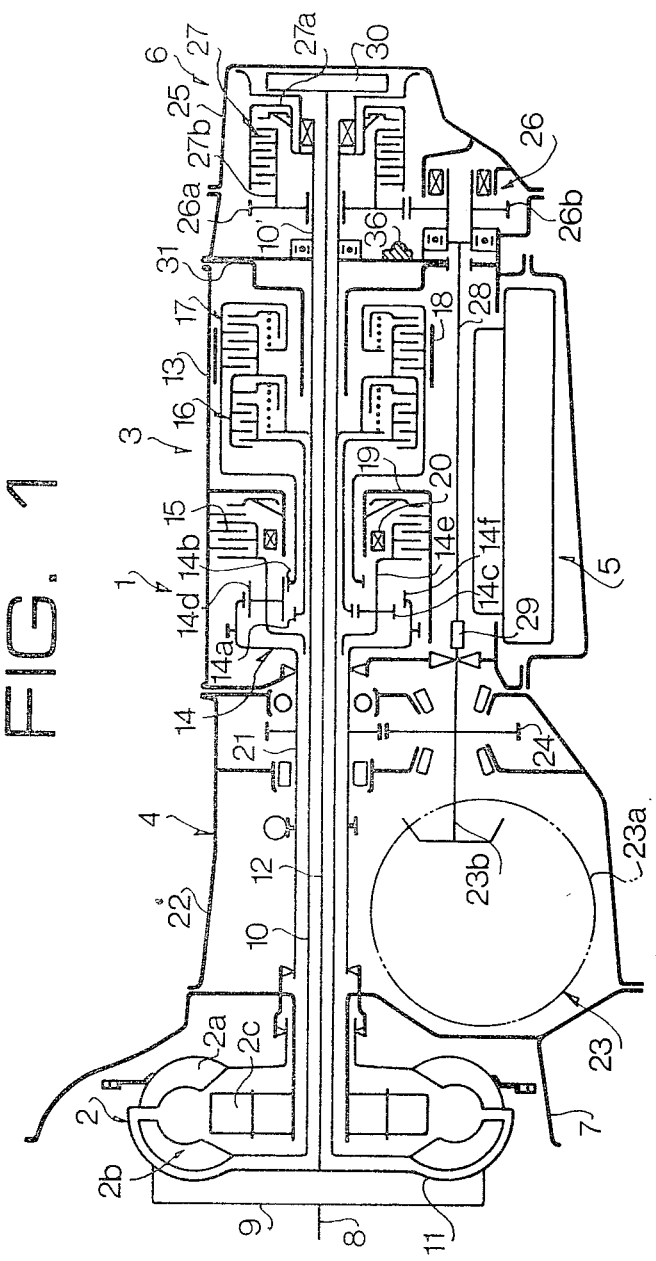
FIG. 1 is a schematic view showing an example of an automatic transmission apparatus with an overdrive device of the present invention.

In FIG. 1, a trans-axle type transmission 1 is provided for driving front-wheels (not shown) of a vehicle, which comprises a torque converter 2, an automatic transmission device 3 for three speeds, a final reduction device 4 disposed between the automatic transmission apparatus 3 and the torque converter 2, a valve block 5 of a hydraulic control means provided in a lower part of the automatic transmission device 3, and an overdrive device 6 arranged in a rear part of the automatic transmission apparatus 3 opposite the torque converter 2.

The torque converter 2 is disposed in a converter housing 7 and comprises a pump impeller 2a, a turbine 2b and a stator 2c. The pump impeller 2a is in direct connection with an engine crankshaft 8 through a drive plate 9. A turbine shaft 10 extends from the turbine 2b and an oil pump driving shaft 12 extends from a converter cover 11 provided integrally with the drive plate 9. The pump impeller 2a is rotated by the engine through the crankshaft 8 to rotate the turbine 2b by the oil flow regulated by the stator 2c.

The automatic transmission apparatus 3 has a transmission case 13 in which there are located a planetary gear 14 at its front part, and a low-and-reverse brake 15 at its rear part, a forward clutch 16, and reverse clutch 17 in this order. The turbine shaft 10 which is connected to the torque converter 2 is connected to a forward sun gear 14a of the planetary gear 14 through the forward clutch 16, and at the same time is connected to a reverse sun gear 14b through the reverse clutch 17 to apply the output of the turbine shaft 10 thereto. Further, a brake band 18 is provided on the drum side of the reverse clutch 17 to lock the reverse sun gear 14b. In the planetary gear 14, a short pinion 14c engaging with the sun gear 14a and a long pinion 14d engaging with the sun gear 14b are supported in a carrier 14e which supports the low-and-reverse brake 15. The carrier is locked by a one-way clutch 20 provided between the low-and-reverse brake 15 and a center support 19. An output shaft 21 extends from a ring gear 14f engaging with the long pinion 14d, to the torque converter.

The final reduction device 4 for the front vehicle wheels has a case 22 secured between the converter housing 7 and the transmission case 13. The case 22 contains a crown gear 23a of a differential mechanism 23 for the front wheels which is located underneath several units including the turbine shaft 10. The output shaft 21 is coupled with a drive pinion 23b through a reduction gear 24 for transmitting the power to the crown gear 23a.

Further, the valve block 5 of the hydraulic control device contains therein various valves and oil passages (not shown). The hydraulic control device is adapted to supply or discharge pressurized oil to or from a servo mechanism of the low-and-reverse brake 15 and clutches 16, 17 and the brake band 18 of the automatic transmission apparatus 3 in accordance with a transmission pattern according to the relation between the vehicle speed and engine load.

The overdrive device 6 of the present invention is provided within a transmission cover 25 which is fixed to the rear end of the transmission case 13. The turbine shaft 10 extends into the transmission cover 25 forming an extension 10' thereat. An overdrive gear device 26 and an overdrive clutch 27 are disposed on the extension 10'. The overdrive gear device 26 comprises a large drive gear 26a and a small driven gear 26b which engage with each other. The drive gear 26a is rotatably mounted on the extension 10' and the driven gear 26b is operatively secured to a rearward extension of the drive pinion 23b, so that a speed-up gear device is provided. An overdrive clutch 27, which is of a hydraulic clutch type, comprises a drum 27a secured to the extension 10' and a hub 27b secured to the drive gear 26a, and is adapted to establish or cut off the connection of the shaft 10 with drive gear 26a. Further, the driven gear 26b is connected to the drive pinion 23b of the final reduction device 4 for the front wheels through an intermediate shaft 28 and a spline joint 29. An oil pump 30 is attached to the cover 25 and connected to the oil pump drive shaft 12.

A clutch support 31 is provided with a valve 36 for changing the overdrive.

Figure 2:
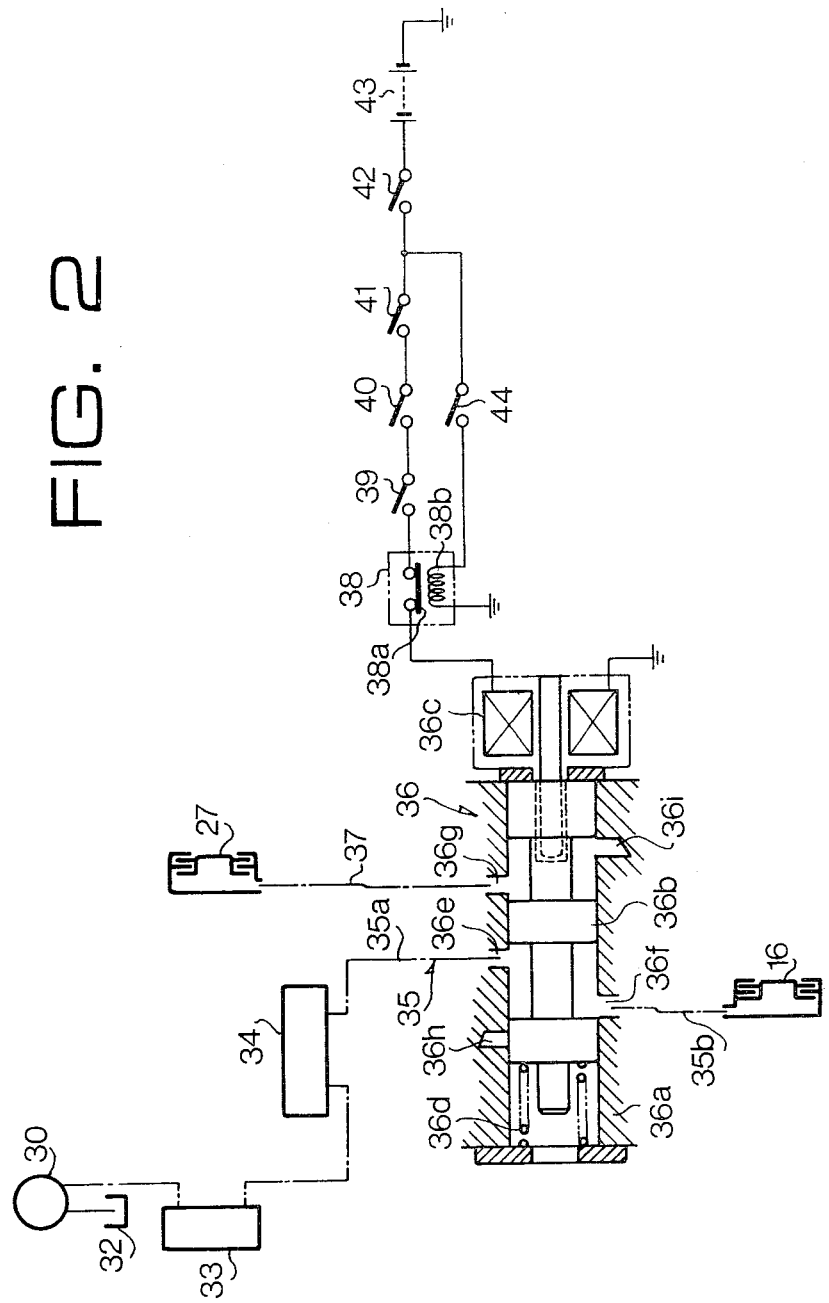
FIG. 2 is a circuit showing an example of the automatic transmission system.

Referring to FIG. 2, the pressure of the oil pumped by the oil pump 30 is adjusted by a pressure regulating valve 33 to produce a line pressure. The line pressure is supplied to the forward clutch 16 through an oil passage 35 via a port 36e and the overdrive valve 36 by the operation of a manual valve 34 during forward driving of the vehicle. The overdrive valve 36 is provided in the oil passage 35 for communicating the pressurized oil with the forward clutch 16 through a passage 35b and with with the overdrive clutch 27 through a passage 37 via a port 36g. The overdrive valve 36 is not provided in the valve block 5 (FIG. 1) which includes the pressure regulating valve 33 and the manual valve 34, but is mounted on the clutch support 31 provided between the valve block 5 and the forward clutch 16 in the automatic transmission as shown in FIG. 1. The overdrive valve 36 comprises a valve body 36a, a valve spool 36b longitudinally displaceably disposed within the body 36a, a solenoid 36c on the right side in FIG. 2 of the body 36a and a spring 36d in the left side of the body 36a. The spool 36b is biased to the right by a spring 36d. When the electromagnetic 36c is not actuated the spring 36d positions the valve spool 36b as shown in FIG. 2 so that the port 36e and the port 36g respectively communicate with port 36f and a drain port 36i as shown in FIG. 2. Leftward movement of spool 36b is caused by energizing the solenoid 36c which causes the port 36f to communicate with a drain port 36h, the port 36e to communicate with the port 36g, and at the same time blocking the drain port 36i. The solenoid 36c of the overdrive valve 36 is electrically connected to a battery 43 through contacts 38a of a relay 38, a governor switch 39 which turns on when the vehicle speed reaches to a predetermined high value suitable for overdriving, a D-range switch 40 which is turned on by the shift operation to the D-range between the 1st- and 2nd-speeds, an overdrive switch 41 which is operated manually, and an ignition switch 42. Further, a kickdown switch 44 which is turned on by a kickdown operation is provided between the ignition switch 42 and a coil 38b of the relay 38. When the kickdown switch is turned on, the coil 38b is excited to cut the contacts 38a.

Figure 3:
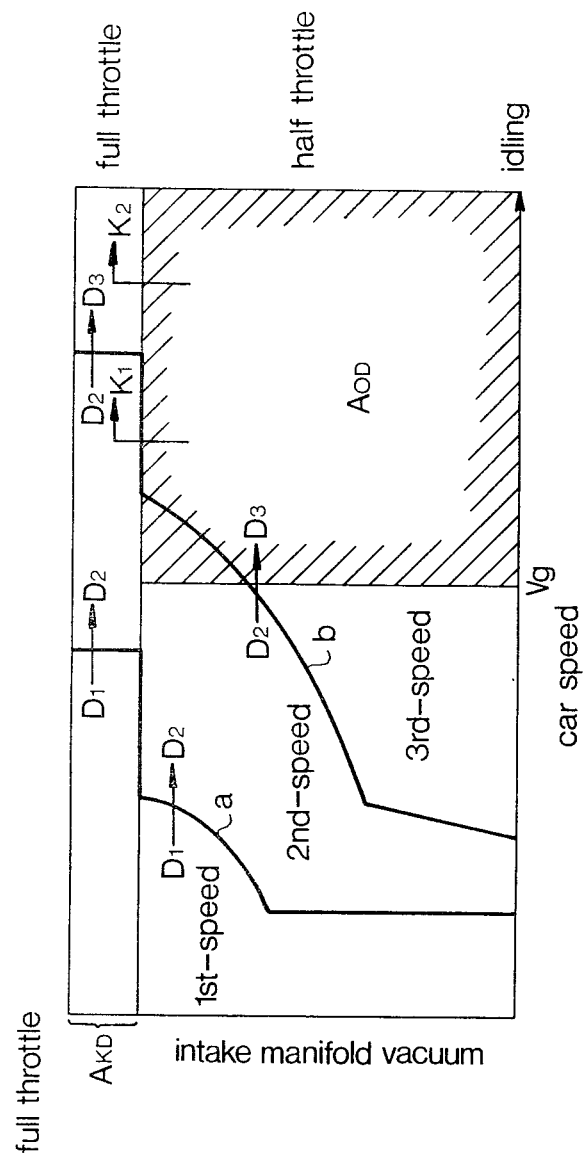
FIG. 3 is a graph showing automatic shift characteristics.

The automatic shift characteristics of the system in an upshift operation is shown in FIG. 3. A certain vehicle speed $V_g$ at which the governor switch 39 is operated is set to such a value that the range of overdriving $A_{OD}$ shown by the hatched zone in FIG. 2 occupies a high speed range in the 3rd-speed including a portion of the 2nd-speed range and is in a range which has a larger intake manifold vacuum than the range of kickdown $A_{KD}$ by the kickdown switch 44.

As the present invention is thus constructed, unless the overdrive switch 41 is operated, the solenoid 36c is not excited, if the vehicle speed reaches the preset high speed to close the governor switch 39. Therefore, the overdrive clutch 27 is in communication with the drain port 36i as shown in FIG. 2. Consequently oil is discharged from the overdrive clutch 27 through the drain port 36i to release the overdrive clutch to disengage the overdrive gear device 26 from the turbine shaft 10. On the other hand, the forward clutch 16 communicates with the manual valve 34 through ports 36f, 36e, and oil passages 36b, 35a, and is supplied with oil. Therefore, the power transferred from the engine crankshaft 8 to the turbine shaft 10 through the torque converter 2 is further transmitted to the forward sun gear 14a in the planetary gear 14 of the automatic transmission to establish forward driving. When the coordinates of the vehicle speed and the intake manifold vacuum in FIG. 3 are at the left side of the curve a in the transmission pattern shown in FIG. 3, the one-way clutch 20 locks the carrier 14e to produce power at the largest gear ratio on the output shaft 21 from the ring gear 14f. The power is further transmitted to the front wheels through the reduction gear 24 and the differential mechanism 23 to establish the 1st-speed driving.

When the vehicle is accelerated to a higher speed beyond the curve a of the automatic shift characteristics, valves in the valve block 5 of the hydraulic control system are actuated to engage the brake band 18 to lock the reverse sun gear 14b of the automatic transmission apparatus. Since the reverse sun gear 14b is held stationary, the planetary carrier 14e rotates around the reverse sun gear 14b. Therefore, the 2nd-speed driving condition at a gear ratio smaller than the above-mentioned ratio is established. Further, when the vehicle speed is increased beyond the curve b in FIG. 3, the reverse clutch 17 instead of the brake band 18 is engaged and the forward sun gear 14a and the reverse sun gear 14b rotate together. The planetary gear system turns as a unit and consequently, the output shaft 21 comes into direct connection with the turbine shaft 19. Thus, the power on the turbine shaft 10 is transmitted to the front wheels in the same manner as mentioned above to establish the 3rd-speed driving condition. The automatic transmission is thus, carried out by the automatic transmission apparatus in the 1st-speed driving condition, 2nd-speed driving condition, both of which have a large reduction gear ratio and the 3rd-speed driving condition in direct connection with the turbine shaft.

In the kickdown operation, which is caused by depressing the accelerator pedal to a wide open throttle for rapid acceleration, corresponding to the kickdown range $A_{KD}$ of FIG. 3, the 3rd-speed driving condition is shifted down to the 2nd-speed driving condition and the 2nd-speed driving condition to the 1st-speed driving condition, in accordance with the characteristics of the curves a, b of the automatic shift characteristics.

On the contrary, if the overdrive switch 41 is kept turned on during high speed driving and the governor switch 39 is turned on at a predetermined set value $V_g$, the solenoid 36c of the overdrive valve 36 is energized to move the valve spool 36b to the left. Thus, the oil passage 35a comes into communication with the overdrive clutch 27 through ports 36e, 36g, and the forward clutch 16 communicates with the drain port 36h. Thus, the forward cluth 16 is disengaged to thereby cut the power to the forward sun gear 14a of the planetary gear 14 making it impossible to perform automatic transmission. On the other hand, being supplied with oil, the overdrive clutch 27 is engaged to transmit the power on the turbine shaft 10 to the overdrive gear device 26. The power is transmitted to the drive pinion 23b of the differential mechanism 23 through the intermediate shaft 28, and is further transmitted to the front wheels through the crown gear 23a. Thus, the driving condition is automatically changed to a speed-up overdrive condition.

Although, overdriving is mainly established during 3rd-speed driving, that is the highest speed stage, it can also be established in 2nd-speed with a wide open throttle, as is clear from the portion of overdrive range $A_{OD}$ at the left of curve b in FIG. 3. As the vehicle speed is reduced and the governor switch 39 is turned off, the solenoid 36 is de-energized. Thus, the overdrive valve 36 returns to the normal position, so that the vehicle is driven by the automatic transmission.

If the kickdown switch is turned on by the above-mentioned kickdown operation during the overdriving condition, the contacts 38a in the relay 38 are disengaged to de-energize the solenoid 36c. Therefore, the overdrive transmission is cut off. Then, according to the vehicle speed at that time, the transmission is automatically shifted down to the 2nd-speed as shown by an arrow $K_1$ or to the 3rd-speed by the arrow $K_2$ of FIG. 3.

During the overdrive condition, the power on the turbine shaft 10 is transmitted to the reverse sun gear 14b of the planetary gear 14 by the engagement of the reverse clutch 17 during the 3rd-speed condition of the transmission 3, or the reverse sun gear 14b is locked by the clamping of the brake band 18 during the 2nd-speed condition of the transmission 3, so that the high revolutions are transmitted from the differential mechanism 23 to the planetary gear 14 through the reduction gear 24 and the output shaft 21. However, since the carrier 14e idles because of a non-operating condition of the one-way clutch 20 and the low-and-reverse brake 15, no detrimental effect occurs.

As described above, in accordance with the present invention, the overdrive device 6 comprises the overdrive gear device 26 having a pair of gears 26a, 26b engaging with each other and the overdrive clutch 27, and the single overdrive valve 36, and the overdrive valve 36 controls the supply and discharge of oil to and from the overdrive clutch 27 and the forward clutch 16. Thus, the construction of transmission control system is simple and reliable operation can be expected.

It will be noted, if the governor switch 39, the D-range switch 40 and the relay contacts 38a are omitted, the overdrive transmission is provided by manually operating the overdrive switch 41.

What is claimed is:

1. An overdrive transmission control system in combination with an automatic transmission of a motor vehicle having a torque convertor having a turbine and provided on the automatic transmission operatively connected with an output shaft of the engine, comprising
a turbine shaft connected with the turbine of the torque convertor and extending through and beyond said automatic transmission forming an extension of said turbine shaft,
said automatic transmission including,
a main transmission having an output shaft,
a forward clutch mounted on the turbine shaft and selectively connectable with said main transmission of the automatic transmission,
a manual valve and an oil pressure regulating valve provided in said automatic transmission,
oil pump means operatively driven by the engine for pressurizing oil,
a final reduction means for operatively transmitting output torque of the forward clutch via the output shaft of the main transmission to a differential mechanism of the vehicle, and
an overdrive transmission mounted on said extension portion of said turbine shaft and including an overdrive clutch and an overdrive gear train connected to the overdrive clutch,
an intermediate shaft connected to said overdrive gear train and to said final reduction means for transmitting output torque of said overdrive transmission to said final reduction means,
overdrive valve means including a solenoid valve for selectively actuating said forward clutch and said overdrive clutch by oil pressure pressurized by said oil pump means through said manual valve and said oil pressure regulating valve provided in said automatic transmission,
switching means including, connected in series, a drive-range switch means for being turned on by shifting operation of said main transmission, a governor switch means for being turned on when the vehicle speed reaches a predetermined high value suitable for overdriving and a manually operated overdrive switch means,
said switching means for actuating said solenoid valve of the overdrive valve means so as to disengage the forward clutch and engage the overdrive clutch dependent on the turning on of all said switch means.

2. The overdrive transmission control system according to claim 1, wherein
said switching means further includes, a relay means having a disconnectable switch in series with said switch means and a selectively manually operated kickdown switch operatively connected to said relay means and connected in parallel with all said switch means of said switching means,
said relay means via said disconnectable switch and said switch means for actuating said solenoid valve of the overdrive valve means,
said relay means for turning said solenoid valve off when the kickdown switch is operated during an overdriving condition.

3. The overdrive transmission control system according to claim 1, wherein
said overdrive gear train includes a drive gear and a smaller driven gear engaging one another,
said overdrive clutch includes a drum secured to said extension of said turbine shaft and a hub selectively engageable with said drum secured to said drive gear, the latter being freely mounted coaxially with respect to said extension of said turbine shaft,
said driven gear is secured to said intermediate shaft, the latter extending substantially parallel to said turbine shaft.

4. The overdrive transmission control system according to claim 3, further comprising
an overdrive transmission cover attached to a rear free end of said automatic transmission remote from said torque convertor,
a clutch support is fastened between said overdrive transmission cover and said rear free end of said automatic transmission,
said overdrive valve means is mounted on said clutch support,
said automatic transmission includes a valve block under said intermediate shaft, said manual valve and said oil pressure regulating valve provided in said valve block in said automatic transmission.

5. The overdrive transmission control system according to claim 4, wherein
said oil pump means is disposed in said overdrive transmission cover at a free end thereof beyond a free end of said extension of said turbine shaft,
an oil pump driving shaft extends coaxially through said turbine shaft and said extension of said turbine shaft and is connected to said torque convertor and said oil pump means.

6. The overdrive transmission control system according to claim 5, wherein
said overdrive valve means includes,
a valve body mounted on said clutch support forming a longitudinal opening having drain ports and other ports operatively communicating with said overdrive clutch, said forward clutch and said oil pump means via said manual valve and said oil pressure regulating valve,
a spool displaceably mounted in said longitudinal opening and having portions selectively blocking and communicating respective of said ports such that said oil pressure means communicates selectively only with one of said overdrive clutch and said forward clutch while the other of said overdrive clutch and said forward clutch is connected to one of said drain ports respectively,
a spring means biasing said spool in one position thereof, and
said solenoid constitutes means for displacing said spool against the biasing of said spring means into another position of said spool.

* * * * *